(12) United States Patent
Okita et al.

(10) Patent No.: US 6,876,170 B2
(45) Date of Patent: Apr. 5, 2005

(54) CONTROLLER

(75) Inventors: Tadashi Okita, Yamanashi (JP); Naoto Sonoda, Kumamoto (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/765,190

(22) Filed: Jan. 28, 2004

(65) Prior Publication Data

US 2004/0183497 A1 Sep. 23, 2004

(30) Foreign Application Priority Data

Jan. 30, 2003  (JP) ..................................... 2003-021765

(51) Int. Cl.[7] .............................................. H02P 1/46
(52) U.S. Cl. ........................ 318/716; 318/715; 318/700
(58) Field of Search ................................ 318/716, 700, 318/724, 721, 722, 715, 254, 138, 439

(56) References Cited

U.S. PATENT DOCUMENTS

| 4,565,956 A | * | 1/1986 | Zimmermann et al. | ..... 318/721 |
| 6,445,154 B1 | * | 9/2002 | Toyozawa et al. | .......... 318/700 |

FOREIGN PATENT DOCUMENTS

JP         2001-78487         3/2001

* cited by examiner

Primary Examiner—Karen Masih
(74) Attorney, Agent, or Firm—Staas & Halsey LLP

(57) ABSTRACT

A controller monitoring an operating state and performing a suitable process when detecting a magnetic pole position by means of a sensor for detecting a position and velocity of a movable part (rotor or movable member) of a synchronous motor. If tandem control is not employed, PWM of the motor is made enable to commence the operation of detecting the magnetic pole position, thus detecting an operation abnormality based on feedback of the position. In the case of tandem control including two position detectors, either a master or slave motor is brought into a free state, and the other is caused to perform the operation of detecting the magnetic pole position, thus detecting an operation abnormality based on the feedback of the position. In the case of the tandem control including one position detector, an adjustment is made to a relative disparity between magnetic pole positions of the motors of master and slave axes, and the operation of detecting the magnetic pole position is simultaneously implemented, thus detecting an operation abnormality based on the position feedback. An abnormality in operation of detecting the magnetic pole position can be detected. Also in the tandem control, it is possible to normally detect the magnetic pole position while preventing flexure and torsion of a machine during the operation of detecting the magnetic pole position.

7 Claims, 2 Drawing Sheets

CONTROLLER

BACKGROUND OF THE INVENTION

1. Field of the Invention

The present invention relates to a controller of a synchronous motor, and more specifically to a controller capable of detecting position of magnetic poles of a movable member of a synchronous motor (a rotor in the case of a rotary synchronous motor and a linear movable member in the case of a linear synchronous motor).

2. Description of the Related Art

In a synchronous motor, it is required to detect a position of a magnetic pole of a movable member since control is performed by detecting the position of the magnetic pole of the movable member to determine an excitation phase for applying an electric current. In order to detect the position of the magnetic pole, dedicated sensors such as an encoder, a resolver and a Hall element for detection of position of the magnetic pole have been conventionally used. However, dedicated sensors for detection of position of a magnetic pole are expensive. Moreover, it is required to perform the positioning of the sensor and the magnetic pole position of the motor, and the work of installing the dedicated sensor is also difficult, resulting in depravation of productivity of the motor.

Consequently, a detecting method for detecting position of the magnetic pole by using a sensor such as a position detector and a velocity detector for detecting a position and velocity of a rotor, without using a dedicated sensor for detection of the magnetic pole position, has been developed. This method includes the steps of applying a direct current to the given excitation phase, detecting a direction of motion of a movable part at the time of the application of the direct current, estimating the magnetic pole position of the rotor, and determining the subsequent excitation phase based on the predicted magnetic pole position, and applying the direct current thereto. This operation is repeated to detect the magnetic pole position of the rotor (see JP 2001-78487A, for example).

According to the method of detecting a magnetic pole position utilizing a sensor for detecting the position and velocity of a rotor or a movable member of a synchronous linear motor without using a dedicated sensor for detection of a magnetic pole position, a direct current is flown at a predetermined excitation phase, and the magnetic pole position is predicted on the basis of the displacing direction of the rotor or the movable member. When the direct current is applied, however, the rotor or the movable member is moved by a large amount in spite that the motion of the rotor should take place within the given range, which occasionally causes an operation abnormality.

Specifically in tandem control in which one axis, namely one object to be driven, is driven by two or more motors, if only one of the motors is provided with a sensor for detecting a position and velocity, when a magnetic pole position is detected using the sensor mounted on one of the motors, the axis (object to be driven) driven by two or more motors twists or bends on account of a disparity between the magnetic pole position of the motor and the magnetic pole positions of the other motors. As a consequence, it is sometimes impossible to detect an exact position of the magnetic pole.

SUMMARY OF THE INVENTION

The present invention provides a controller capable of monitoring an operating state and detecting an operation abnormality when detecting a magnetic pole position by means of a sensor for detecting a position and velocity of a movable member (a rotor or a linear motion member) of a synchronous motor, and also capable of detecting an exact position of the magnetic pole even in the case of tandem control.

A controller of the present invention controls a synchronous motor having a movable member and a stationary member, one of said movable member and stationary member being provided with magnetic poles and the other thereof provided with excitation coils. The controller comprising: a motor control section for drivingly controlling the synchronous motor and detecting position of the magnetic poles relative to the excitation coils by exciting the excitation coils at a predetermined excitation phase using a sensor for detecting position or velocity of the movable member; and a numerical control section for performing numerical control by issuing commands to said motor control section, wherein the numerical control section outputs a start command to start detection of the position of the magnetic poles to said motor control section, said motor control section starts detection of the position of the magnetic poles in response to the start command and informs said numerical control section of a state of the detection of the position of the magnetic poles, and said numerical control section determines a normal completion or an abnormality of the detection based on the state of the detection informed by said motor control section.

The numerical control section may stop the detection of the position of the magnetic poles and issue an alarm when an abnormality of the detection is determined.

A plurality of motor control sections may be provided for respectively drivingly controlling a plurality of synchronous motors for cooperatively driving one driven element. In this case, the numerical control section may output a start command to one of the plurality of motor control sections to start detection of position of the magnetic poles to enable the detection of the magnetic poles in an associated synchronous motor, and issue commands to the others of the motor control sections to release excitation of associated synchronous motors to eliminate interference with the detection of the position of the magnetic poles by the one motor control section. Alternatively, the numerical control section may issue start commands for starting detections of positions of the magnetic poles to the plurality of motor control sections to enable the detections of the positions of the magnetic poles of associated synchronous motors simultaneously. In this case, the controller may further comprise a storage device storing a relative motion between positions of the magnetic poles of the plurality of synchronous motors, and the plurality of motor control sections may perform the detections of the positions of the magnetic poles using the relative motion between the positions of the magnetic poles stored in the storage device.

The synchronous motor may comprise a linear synchronous motor in which one of the movable member and the stationary member is provided with magnetic poles, and the other thereof provided with excitation coils. Alternatively, the synchronous motor may comprise a rotary synchronous motor having a rotor as the movable member provided with magnetic poles and a stator as the stationary member provided with excitation coils.

DETAILED DESCRIPTION

Figure 1:
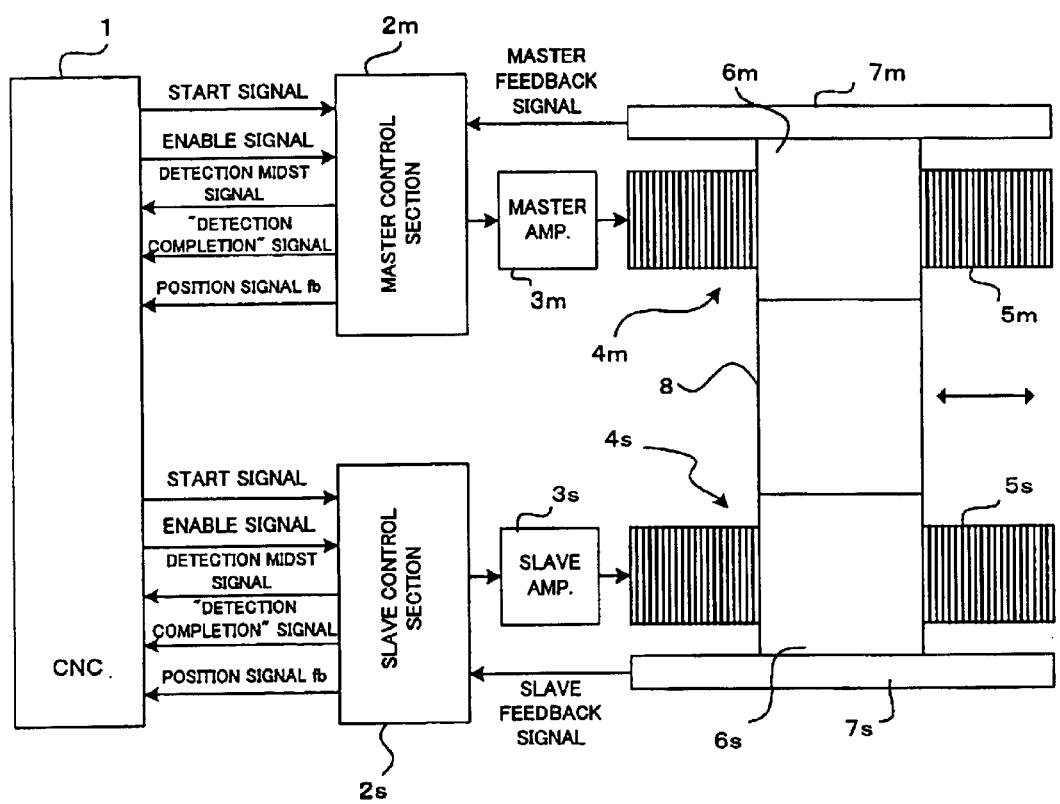
FIG. 1 is a block diagram showing one embodiment of the present invention.

FIG. 1 is a block diagram showing one embodiment of the present invention. According to this embodiment, position of a magnetic pole is detected using a linear scale for detecting a position and velocity, that is provided to each synchronous linear motor, in tandem control for driving one table serving as an object to be driven by means of two synchronous linear motors.

The present embodiment includes a numerical control section 1 comprising a numerical controller, a master control section 2m constructing a motor control section for performing drive control on a synchronous linear motor 4m of a master axis, a slave control section 2s constructing a motor control section for performing drive control on a synchronous linear motor 4s of a slave axis, a master amplifier 3m and a slave amplifier 3s. The synchronous linear motor 4m of the master axis comprises a stator 5m and a movable member 6m, whereas the synchronous linear motor 4s of the slave axis comprises a stator 5s and a movable member 6s. Either the stator 5m or the movable member 6m, and either the stator 5s or the movable member 6s, are provided with respective magnetic poles, and the others with respective excitation coils. According to the embodiment illustrated in FIG. 1, the stators 5m and 5s are provided with their respective magnetic poles, while the movable members 6m and 6s with their respective excitation coils.

Furthermore, linear scales 7m and 7s for detecting positions and velocity of the movable members 6m and 6s are fixed to the master axis and the slave axis, respectively. The positions and velocity that are detected by the linear scales 7m and 7s are feedbacked to the master control section 2m and the slave control section 2s, respectively. In addition, fixed to both the movable members 6m and 6s is a table 8 as an object to be driven.

The numerical control section 1 outputs motion commands to the master control section 2m and the slave control section 2s. Based on the motion commands, the master control section 2m and the slave control section 2s perform the drive control on the synchronous linear motors 4m and 4s by way of the master amplifier 3m and the slave amplifier 3s, respectively, and are synchronized with the table 8 that is fixed to both the movable members 6m and 6s to perform the drive control.

Particularly in the present invention, the numerical control section 1 outputs to the master control section 2m and the slave control section 2s, a magnetic pole detection-start signal for detection of the magnetic pole position and an enable signal that commands to enable a PWM signal to the master amplifier 3m and the slave amplifier 3s. The master control section 2m and the slave control section 2s output to the numerical control section 1, a signal indicating midst of the detection of the magnetic pole position, a signal indicating completion of the detection of the magnetic pole position, and even position feedback signals that are feedbacked from the linear scales 7m and 7s.

By outputting the magnetic pole detection-start signal and the enable signal to the master control section 2m and the slave control section 2s, the numerical control section 1 controls a process for detecting the magnetic pole position that is carried out by the master control section 2m and the slave control section 2s. Moreover, based on the "midst of detection of the magnetic pole position" signal sent back from the master control section 2m and the slave control section 2s and the position feedback signals, the numerical control section 1 monitors the operation of detecting the magnetic pole position until the "completion of the detection of the magnetic pole position" signal is sent back, and also stops the operation of detecting the magnetic pole position and outputs an alarm or the like when determining that there is an operation abnormality.

Figure 2:
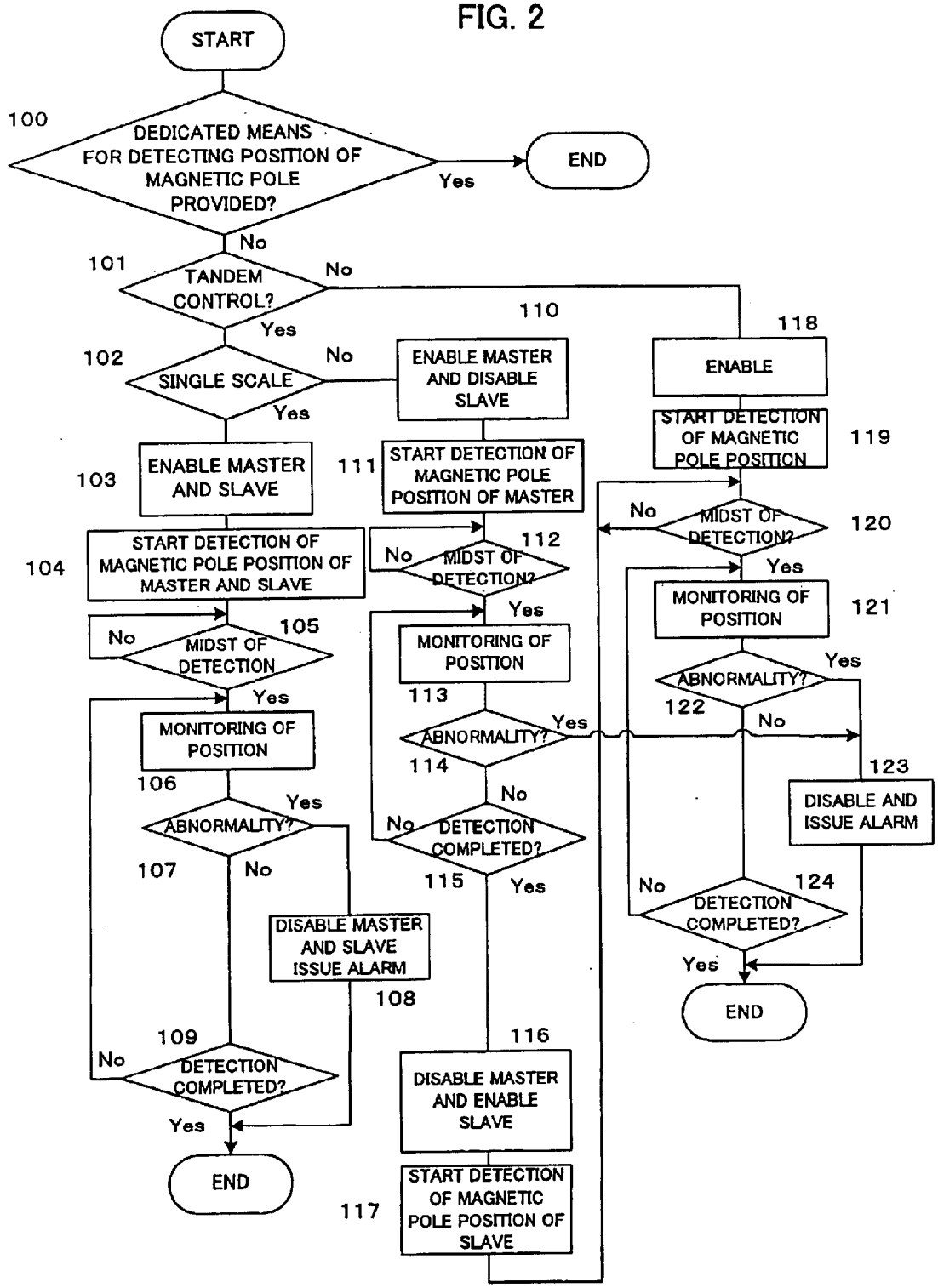
FIG. 2 is a flowchart showing a process for managing and monitoring operation of detecting a magnetic pole position, that is performed by a numerical control section in the same embodiment.

FIG. 2 is a flowchart showing a process for managing and monitoring operation of detecting the magnetic pole position that is implemented by a processor of the numerical control section 1.

The example illustrated in FIG. 2 is so constructed as to be applicable to various systems in which the numerical control section 1 is employed, and is also designed to be able to manage and monitor the detection of the magnetic pole position with or without means (sensor) for detecting the magnetic pole position and even in the case of the tandem control in which a plurality synchronous motors are connected to one another.

Once a command to detect the magnetic pole position is inputted to the numerical control section 1, the processor of the numerical control section 1 first determines whether or not a synchronous motor connected to the numerical control section 1 has a dedicated sensor for detecting the magnetic pole position (Step 100). If the synchronous motor has the dedicated sensor, the process is terminated since there is no need for the process for detecting the magnetic pole position. On the contrary, if the synchronous motor has no dedicated sensor for detecting the magnetic pole position, the processor determines whether the tandem control performing the drive control on one object to be driven by using a plurality of synchronous motors is employed or not (Step 101).

In the embodiment shown in FIG. 1, the processor determines the tandem control is employed since the table 8 serving as an object to be driven is driven synchronously by way of two synchronous linear motors 4m and 4s, and thereafter determination is made as to whether the position is detected using one scale or using two or more scales (Step 102). Since there are two linear scales in the embodiment illustrated in FIG. 1, the process advances to Step 110. First of all, the master control section 2m is given a command that an enable signal be ON, whereas the slave control section 2s is given a command that an enable signal be OFF. Accordingly, the master control section 2m brings a PWM signal to the master amplifier 3m for driving the synchronous linear motor 4m into an ON state, and the slave control section 2s brings a PWM signal to the slave amplifier 3s into an OFF state. As a result, the excitation of the synchronous linear motor 4s of the slave axis is released, which brings the synchronous linear motor 4s into a free state that allows free motion.

The processor of the numerical control section 1 outputs to the master control section 2m a command to start detecting the magnetic pole position (Step 111). In response to the command to start detecting the magnetic pole position, the processor of the master control section 2m commences a process of operation of detecting the magnetic pole position, that is disclosed in JP 2001-78487A and the like.

The processor of the numerical control section 1 stays in standby until receiving the "midst of detection of the magnetic pole position" signal from the master control section 2m (Step 112). Upon receiving the "midst of detection of the magnetic pole position" signal, the processor of the numerical control section 1 monitors a position feedback signal transmitted from the master control section 2m and repeatedly makes determinations as to whether the motion within a given time interval is at or under a given value, whether the motion is over a given value, which means an operation abnormality, and whether the detection-completion signal is received (Steps 113 through 115), thereby monitoring the operation of detecting the magnetic pole position.

Although, as shown in FIG. 1, the movable member 6m of the synchronous linear motor 4m of the master axis and the movable member 6s of the synchronous linear motor 4s of the slave axis are connected to the table 8, there generates neither torsion nor flexure in a drive transmission structure of the table 8 and the master and slave axes. This is because, when the movable member 6m of the synchronous linear motor 4m for driving the master axis is moved for operation of detecting the magnetic pole position, the table 8 and the movable member 6s of the synchronous linear motor 4s of the slave axis are also moved together since the synchronous linear motor 4s for driving the slave axis is released from the excitation in response to the OFF state, namely a disable state, of the PWM signal.

During the operation of detecting the magnetic pole position is monitored by repeatedly implementing the process of the Steps 113 through 115, if it is determined on the basis of the position feedback signal that the motion of the movable member 6m is over the given value and that there occurs an operation abnormality, the process advances to Step 123 of outputting enable OFF to the master control section 2m and outputting an alarm to indicate the alarm of the operation abnormality in detection of the magnetic pole position by way of indicating means or the like. Furthermore, the master control section 2m that has received the enable OFF brings the PWM signal into the disable state, brings the movable member 6m into the free state that allows free motion, and terminates the process of operation of detecting the magnetic pole position.

On the contrary, if no abnormality is detected, and the "completion of detection of the magnetic pole position" signal is transmitted from the master control section 2m, the processor of the numerical control section 1 gives the master control section 2m a command that the enable signal be OFF and gives the slave control section 2s a command that the enable signal be ON. Accordingly, the master control section 2m brings the PWM signal into the OFF state (disable state), and brings the movable member 6m of the synchronous linear motor 4m of the master axis into the free state that allows free motion. The slave control section 2s brings the PWM signal to the slave amplifier 3s into the ON state, thereby enabling the operation of detecting the magnetic pole position of the synchronous linear motor 4s of the slave axis (Step 116).

Then, a signal commanding to start detecting the magnetic pole position is outputted to the slave control section 2s (Step 117). In response to the signal commanding to start detecting the magnetic pole position, the slave control section 2s commences the process of operation of detecting the magnetic pole position. The processor of the numerical control section 1 receives the "detection midst" signal that is transmitted from the slave control section 2s (Step 120), and repeatedly performs the abnormality-detecting process of Steps 121 through 124 identical to the Steps 112 through 115 until receiving the "completion of detection of the magnetic pole position" signal from the slave control section 2s. As mentioned above, if a motion amount of the movable member 6s within the given time interval, that is determined on the basis of the received position feedback signal, is large, it is determined that there occurs an operation abnormality in process for detecting the magnetic pole position, thereby outputting an alarm, and simultaneously outputting the enable OFF to the slave control section to disable the operation of detecting the magnetic pole position.

If no abnormality is detected, and the "completion of detection of the magnetic pole position" signal is transmitted from the slave control section 2s, the process for managing and monitoring the operation of detecting the magnetic pole position is terminated. Also during the operation of detecting the magnetic pole position of the linear motor 4s for driving the slave axis, the movable member 6m of the linear motor 4m of the master axis is in the state where it is freely moved since the linear motor 4m of the master axis is released from excitation in response to the OFF state of the PWM, thus generating neither torsion nor flexure in a machine, such as the table 8 and the like.

The foregoing describes the operation of process for managing and monitoring the operation of detecting the magnetic pole position in the embodiment that carries out the tandem control according to the present invention, that is illustrated in FIG. 1.

In contrast, when the tandem control is not employed, the synchronous motor independently drives the object to be driven, so that it is not required to consider relation with other synchronous motors. Firstly in this case, the enable signal is turned ON to bring the PWM signal to the amplifier for driving the synchronous motor into the ON state (Step 118), and the signal commanding to start detecting the magnetic pole position is turned ON to cause a controlling portion for performing the drive control on the synchronous motor to commence the operation of process for detecting the magnetic pole position (Step 119). The processor of the numerical control section 1 carries out the aforementioned process of after the Step 119, thereby monitoring the operation of detecting the magnetic pole position.

In cases where it is determined that the numerical control section 1 performs the tandem control and that there is one scale (Step 102), there is only one detector for detecting the position and velocity in spite that a plurality of synchronous motors synchronously drive the object to be driven. An example of the foregoing would be modification of the embodiment shown in FIG. 1, the modification in which only the master axis is provided with the linear scale 7m, and the slave axis is not provided with the linear scale 7s. Hereinafter, descriptions will be given on condition that the linear scale 7m is fixed only to the master axis.

First, the enable signal ON is outputted to the master control section 2m and the slave control section 2s. In response, the master control section 2m and the slave control section 2s bring the PWM signal into the enable state, thus causing the synchronous linear motors of the master and slave axes to be operational (Step 103).

Subsequently, the signal commanding to start detecting the magnetic pole position is outputted to the master control section 2m and the slave control section 2s (Step 104). The "detection midst" signal is expected to be transmitted from the master control section 2m and the slave control section 2s, and once the signal is received (Step 105), the detection of abnormality and the monitoring process concerning the operation of detecting the magnetic pole position in the Steps 106 through 109 are implemented with respect to both the master and slave axes. The detection of abnormality and the monitoring process concerning the operation of detecting the magnetic pole position in the Steps 106 through 109 are equivalent to the process in the Steps 113 through 115 and that of the Steps 121 through 124. However, there is difference in that, when an operation abnormality is detected in either the master control section 2m or the slave control section 2s, the enable OFF is outputted to the master control section 2m and the slave control section 2s. Thus, the PWM signal is made disable, and both the synchronous linear motors 4m and 4s are brought into a free state, which stops the operation of detecting the magnetic pole position. In addition, an alarm signal is outputted, thereby announcing the occurrence of abnormality in operation of detecting the magnetic pole position.

If no abnormality is detected, and the "completion of detection of the magnetic pole position" signal is transmitted from the master control section 2m and the slave control section 2s, the process for managing and monitoring the operation of detecting the magnetic pole position is terminated. In the tandem control using only one scale, as mentioned above, the process for detecting the magnetic pole position is carried out by synchronously driving the synchronous motors (synchronous linear motors) of the master and slave axes. Therefore, it is required to make adjustments so that there occurs no relative displacement between the magnetic pole positions of the synchronous motors (synchronous linear motors) of the master and slave axes. Without the relative displacement, there is no problem since the synchronous motors (synchronous linear motors) 4m and 4s of the master and slave axes synchronously operate during the operation of detecting the magnetic pole position. However, if there is a relative displacement between the magnetic pole positions of the synchronous motors (synchronous linear motors) 4m and 4s of the master and slave axes, the relative displacement is beforehand measured and stored in a memory device or the like of the numerical control section 1. When the operation of detecting the magnetic pole position commences, the above displacement is read and transmitted to the slave control section 2s or the master control section 2m to be corrected, thus performing the operation of detecting the magnetic pole position.

Although, in the aforementioned embodiment, an abnormality in operation of detecting the magnetic pole position is detected on the basis of the position feedback signal that is transmitted from the motor control section (master control section 2m and slave control section 2s), the abnormality in operation of detecting the magnetic pole position may be detected by using a velocity feedback signal instead of the position feedback signal. Furthermore, although an example of the tandem control performed by using the synchronous linear motor is described in the aforementioned embodiment, the present invention is also applicable to a regular rotary synchronous motor.

When the magnetic pole position is detected using the sensor for detecting the position and velocity of the rotor and the movable member in the synchronous motor without the sensor for detecting a magnetic pole position, the present invention is capable of monitoring the detecting operation and detecting an operation abnormality. Furthermore, even in cases where tandem control is performed, the present invention is capable of normally implementing the operation of detecting the magnetic pole position without generating torsion and flexure in the machine.

What is claimed is:

1. A controller for controlling a synchronous motor having a movable member and a stationary member, one of said movable member and stationary member being provided with magnetic poles and the other thereof provided with excitation coils, said controller comprising:

a motor control section for drivingly controlling the synchronous motor and detecting position of the magnetic poles relative to the excitation coils by exciting the excitation coils at a predetermined excitation phase using a sensor for detecting position or velocity of the movable member; and a numerical control section for performing numerical control by issuing commands to said motor control section, wherein said numerical control section outputs a start command to start detection of the position of the magnetic poles to said motor control section, said motor control section starts detection of the position of the magnetic poles in response to the start command and informs said numerical control section of a state of the detection of the position of the magnetic poles, and said numerical control section determines a normal completion or an abnormality of the detection based on the state of the detection informed by said motor control section.

2. A controller according to claim 1, wherein said numerical control section stops the detection of the position of the magnetic poles and issues an alarm when an abnormality of the detection is determined.

3. A controller according to claim 1, wherein a plurality of motor control sections are provided for respectively drivingly controlling a plurality of synchronous motors for cooperatively driving one driven element, and said numerical control section outputs a start command to one of said plurality of motor control sections to start detection of position of the magnetic poles to enable the detection of the magnetic poles in an associated synchronous motor, and issues commands to the others of said motor control sections to release excitation of associated synchronous motors to eliminate interference with the detection of the position of the magnetic poles by the one motor control section.

4. A controller according to claim 1, wherein a plurality of motor control sections are provided for respectively drivingly controlling a plurality of synchronous motors for cooperatively driving one driven element, and said numerical control section issues start commands for starting detections of positions of the magnetic poles to said plurality of motor control sections to enable the detections of the positions of the magnetic poles of associated synchronous motors simultaneously.

5. A controller according to claim 4, further comprising a storage device storing a relative displacement between positions of the magnetic poles of the plurality of synchronous motors, wherein said plurality of motor control sections perform the detections of the positions of the magnetic poles using the relative displacement between the positions of the magnetic poles stored in said storage device.

6. A controller according to any one of claims 1 through 5, wherein the synchronous motor comprises a linear synchronous motor in which one of the movable member and the stationary member is provided with magnetic poles, and the other thereof provided with excitation coils.

7. A controller according to any one of claims 1 through 5, wherein the synchronous motor comprises a rotary synchronous motor having a rotor as the movable member provided with magnetic poles and a stator as the stationary member provided with excitation coils.

* * * * *